US008371248B2

(12) United States Patent
Redick

(10) Patent No.: US 8,371,248 B2
(45) Date of Patent: Feb. 12, 2013

(54) PET WASHING APPARATUS

(76) Inventor: Kevin L. Redick, Homewood, IL (US)

( * ) Notice: Subject to any disclaimer, the term of this patent is extended or adjusted under 35 U.S.C. 154(b) by 23 days.

(21) Appl. No.: 12/701,514

(22) Filed: Feb. 5, 2010

(65) Prior Publication Data

US 2011/0083613 A1 Apr. 14, 2011

Related U.S. Application Data

(60) Provisional application No. 61/150,170, filed on Feb. 5, 2009.

(51) Int. Cl.
*A01K 29/00* (2006.01)
*A47K 3/32* (2006.01)
(52) U.S. Cl. .............................. 119/671; 119/673; 4/599
(58) Field of Classification Search .................. 119/671, 119/668, 669, 673, 678, 458, 479, 431, 432, 119/456, 461, 474, 475, 491, 650, 674; 4/599, 4/600, 568, 570, 564.1, 565.1, 566.1
See application file for complete search history.

(56) References Cited

U.S. PATENT DOCUMENTS

| 268,240 | A | * | 11/1882 | Castle | 4/600 |
|---|---|---|---|---|---|
| 689,164 | A | * | 12/1901 | Jones | 4/599 |
| 3,293,664 | A | * | 12/1966 | Coons | 4/599 |
| 3,657,746 | A | * | 4/1972 | Downey | 4/599 |
| 3,925,828 | A | * | 12/1975 | Kim | 4/599 |
| 3,935,600 | A | * | 2/1976 | Scribner | 4/495 |
| 4,419,776 | A | * | 12/1983 | Schmidt | 4/564.1 |
| 4,557,002 | A | * | 12/1985 | Schmidt | 4/564.1 |
| 4,782,792 | A | * | 11/1988 | Anthony et al. | 119/665 |
| 4,934,001 | A | | 6/1990 | Landreth | |
| 4,975,992 | A | * | 12/1990 | Patterson et al. | 4/599 |
| 5,213,064 | A | | 5/1993 | Mondine et al. | |
| 5,243,931 | A | | 9/1993 | McDonough | |
| 5,632,231 | A | | 5/1997 | Moore | |
| 5,662,069 | A | | 9/1997 | Smith | |
| 5,678,511 | A | | 10/1997 | Day | |
| 5,711,252 | A | | 1/1998 | Brandolino | |
| 5,794,570 | A | | 8/1998 | Foster et al. | |
| 5,930,912 | A | | 8/1999 | Carder | |
| 5,970,536 | A | * | 10/1999 | Suarez | 4/599 |
| 5,974,601 | A | | 11/1999 | Drane et al. | |
| 6,553,943 | B1 | | 4/2003 | Murphy | |
| 7,100,538 | B2 | | 9/2006 | Motomura | |
| 7,241,250 | B1 | * | 7/2007 | French et al. | 482/54 |
| 7,357,098 | B2 | | 4/2008 | Foster | |
| 7,913,652 | B1 | * | 3/2011 | Lutz | 119/674 |
| 7,946,253 | B2 | * | 5/2011 | Smith et al. | 119/756 |
| 2007/0289548 | A1 | * | 12/2007 | Smoot | 119/668 |
| 2007/0295285 | A1 | * | 12/2007 | Smith et al. | 119/753 |

OTHER PUBLICATIONS

U.S. Appl. No. 10/596,073, filed Apr. 12, 2007.
U.S. Appl. No. 10/862,010, filed Dec. 20, 2007.
U.S. Appl. No. 11/226,652, filed Mar. 15, 2007.
U.S. Appl. No. 11/249,354, filed May 18, 2006.

* cited by examiner

*Primary Examiner* — Kristen C Hayes

(57) ABSTRACT

A pet washing apparatus is disclosed. The apparatus includes a base, a top member, side supports, and a flexible side wall. In various embodiments, a water line brings water in from a water source such as a sink faucet. The water line is attached to a nozzle. A drain tray is placed over the base so that water used within the apparatus drains through the drain tray into the base. A pump is provided in the base to pump water out of the base through a water exit line, for example, into a sink drain. The device is collapsible such that the drain tray, side support, and top member all collapse and fit within the base. Optionally, the base has a handle and wheels.

13 Claims, 6 Drawing Sheets

PET WASHING APPARATUS

CROSS-REFERENCE TO RELATED APPLICATIONS

This application claims the benefit of U.S. Provisional Application No. 61/150,170, filed Feb. 5, 2009, which is hereby incorporated by reference herein in its entirety.

BACKGROUND OF THE INVENTION

1. Field of the Invention

The present invention relates to an apparatus for washing a pet, and more particularly, to a convenient and useful pet washing apparatus.

2. Background

Various devices have been used for grooming or bathing pets. For example, U.S. Pat. No. 5,213,064, issued to Mondine et al., discloses an animal bath apparatus. The apparatus is shaped like a box. While the device could be used to bathe a pet from the top, it does not provide for drainage of used bath water. Furthermore, it is not collapsible and thus it is cumbersome to move around and takes up significant storage space.

U.S. Pat. No. 5,243,931, issued to McDonough, discloses a tub to be used for washing an animal. However, again, the device takes up significant space, and drainage is through the bottom only.

Numerous other apparatus have been proposed. However, none of them are particularly compact, nor do they provide a useful way to handle drainage issues.

Thus, there remains a need for a pet washing apparatus which is collapsible, compact, easily portable, and provides a convenient way to bathe a pet.

SUMMARY

The present invention is a pet washing apparatus. The apparatus provides a convenient way for a pet owner to groom or wash a pet, such as a dog or other animal.

The pet washing apparatus of the present invention includes a base, a side support device, and a top member. The side support member, ideally a scissor lift, is collapsible and fits within a track in the base and the top member. Thus, the top member and scissor lift can be collapsed to fit within the base, making the apparatus very compact, portable, and easy to store.

In various embodiments, the apparatus includes a drain tray which covers a cavity in the base. The drain tray has drain holes in it to allow used water to drain through to the cavity of the base. From there, a pump pumps water out of the cavity through an exit line which may be directed to a drain such as a sink drain.

A water line is used to bring water to a water dispensing device such as a spray nozzle. The nozzle may be mounted to the top cover, and may be movable and removable. The water line can include a tube which can be connected to a water source such as a sink faucet.

A flexible side wall extends from the top member down to the base. In various embodiments, the side wall is a curtain similar to a shower curtain. One or more holes may be provided in the curtain to allow a user to pass one or both hands through the holes to access the nozzle and wash a pet. The curtain is removably mounted on a track in the top member.

In various embodiments, the top member is a top cover. The top cover may have a handle, or one or two holes passing through the center of the cover to enable a user to lift the top cover easily.

The base may have a cavity for collecting used water. The cavity is open to the top, and may be shaped so that water will drain toward a low point where the pump will intake water. The base may further include a handle and a pair of wheels so that the unit can be easily moved, especially in a collapsed mode.

Still other objects and advantages of the present invention will become readily apparent to those skilled in the art from the following detailed description, wherein it is shown and described only the preferred embodiments of the invention, simply by way of illustration of the best mode contemplated of carrying out the invention. As will be realized, the invention is capable of other and different embodiments and its several details are capable of modifications in various obvious respects, without departing from the invention. Accordingly, the drawings, wherein like reference numerals represent like features, and description are to be regarded as illustrative in nature and not as restrictive.

DETAILED DESCRIPTION OF THE INVENTION

Figure 1:
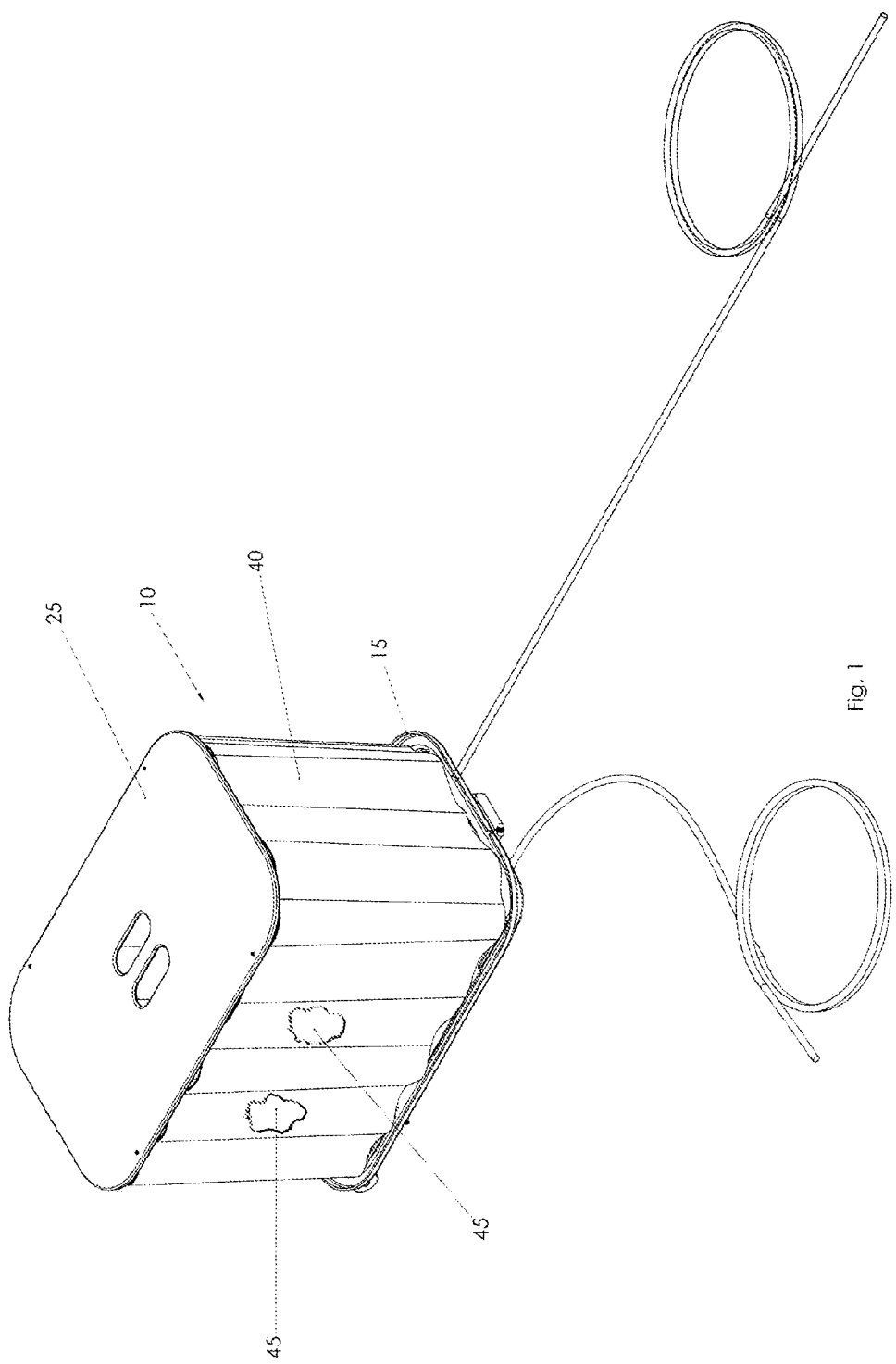
FIG. 1 shows a perspective view of the apparatus of the present invention.
Figure 2:
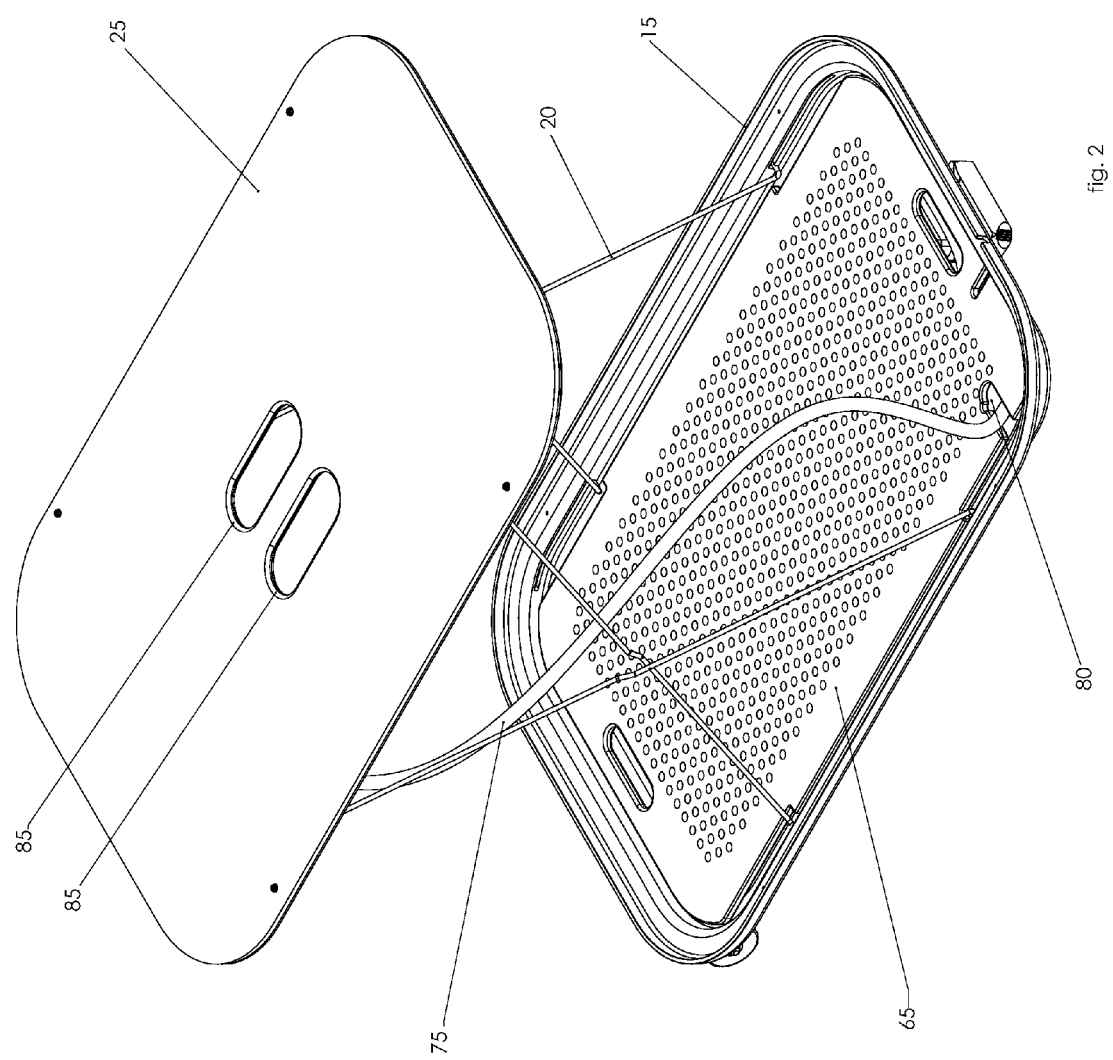
FIG. 2 shows another perspective view of the apparatus of the present invention without the flexible side wall attached.
Figure 3:
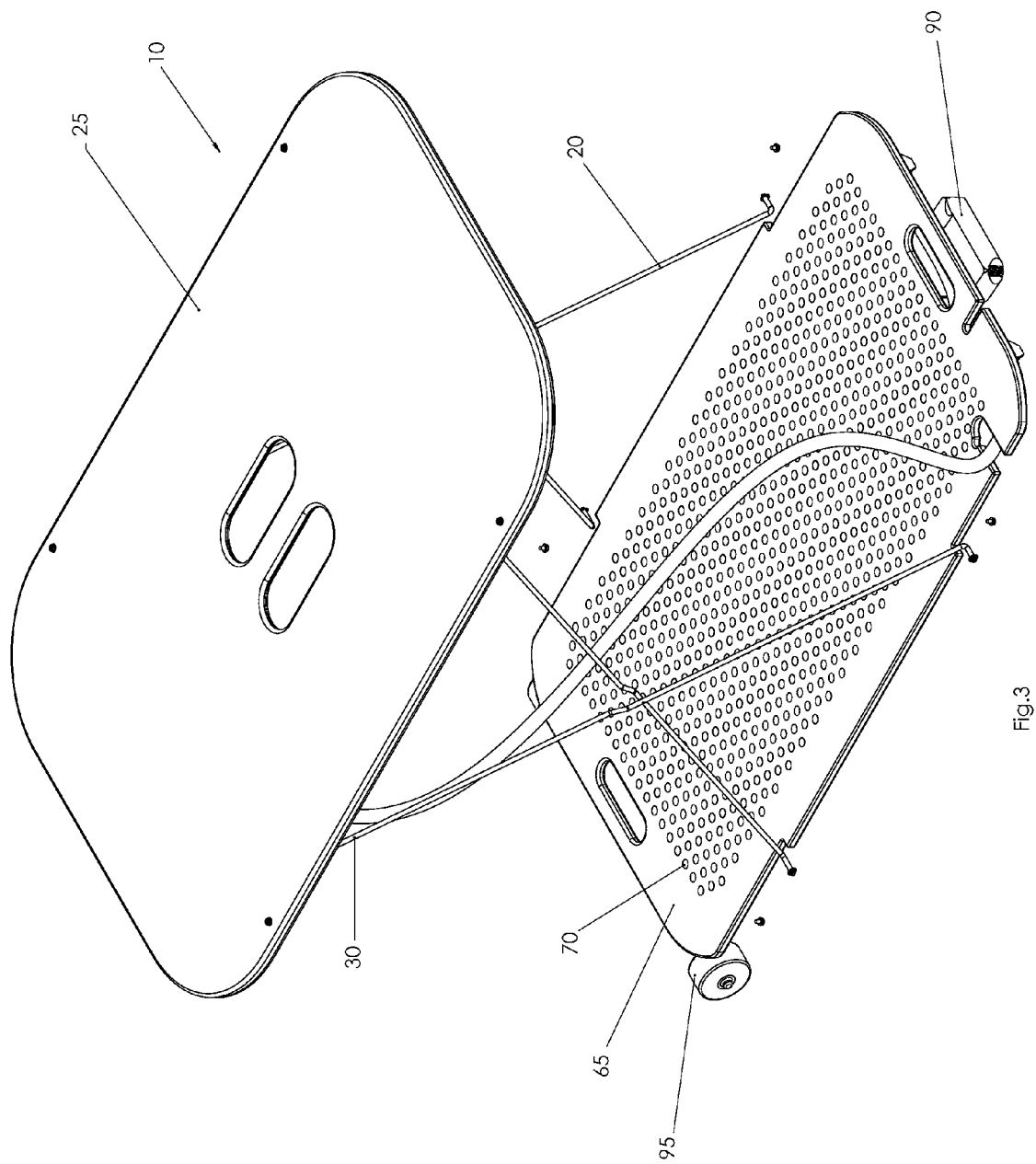
FIG. 3 shows a perspective view of the apparatus of the present invention without the base.
Figure 4:
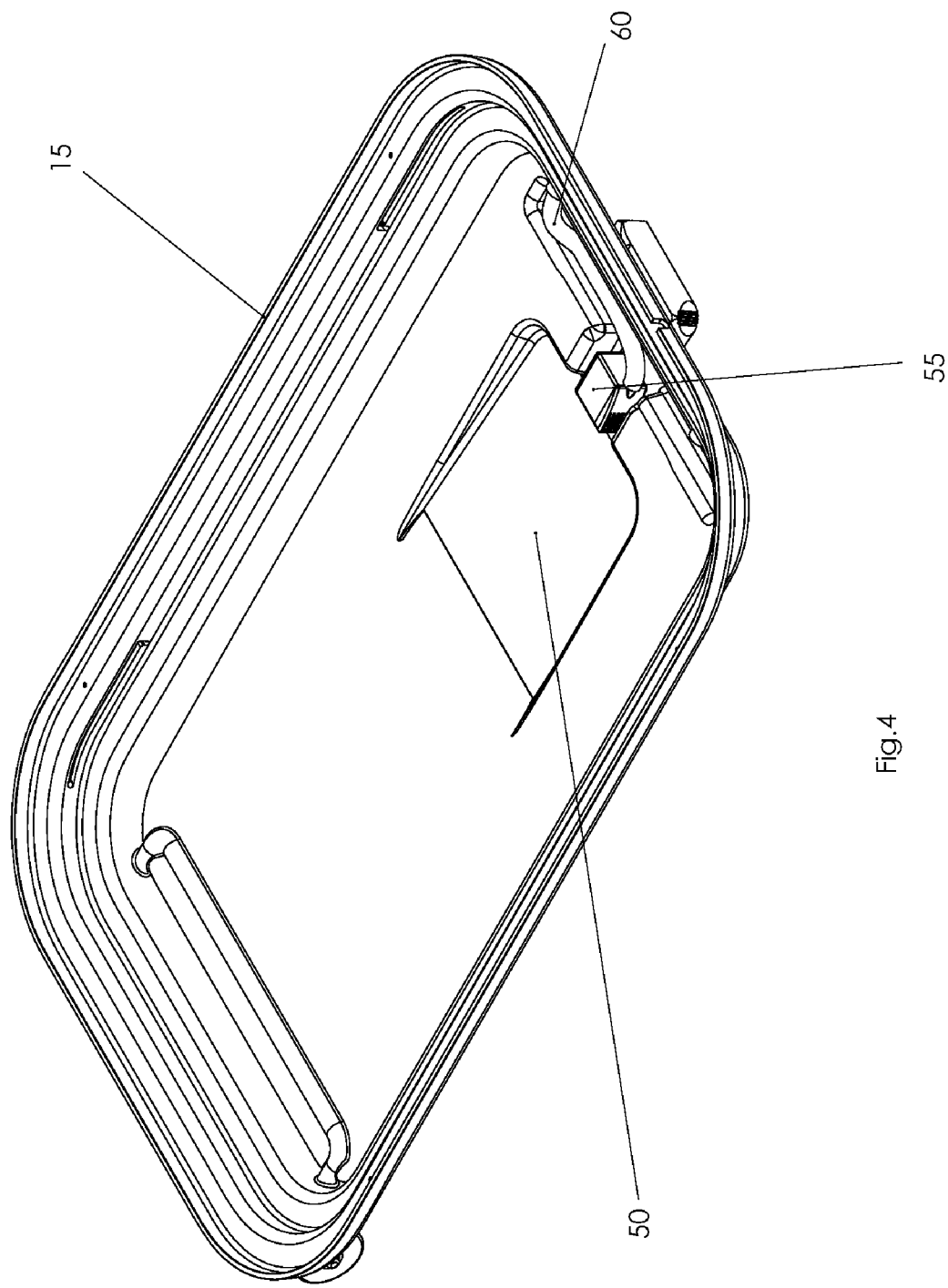
FIG. 4 shows a perspective view of the base of the apparatus of the present invention.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspect of the invention to the embodiments illustrated.

The present invention is pet washing apparatus 10. The apparatus includes a base 15 which is substantially impermeable to water. A first side support member 20 extends upward from the base 15 to a top member 25. In various embodiments, a second side support member 30 extends upward from the base 15 to the top member 25. Together, side supports 20 and 30 may form a scissor lift.

Figure 5:
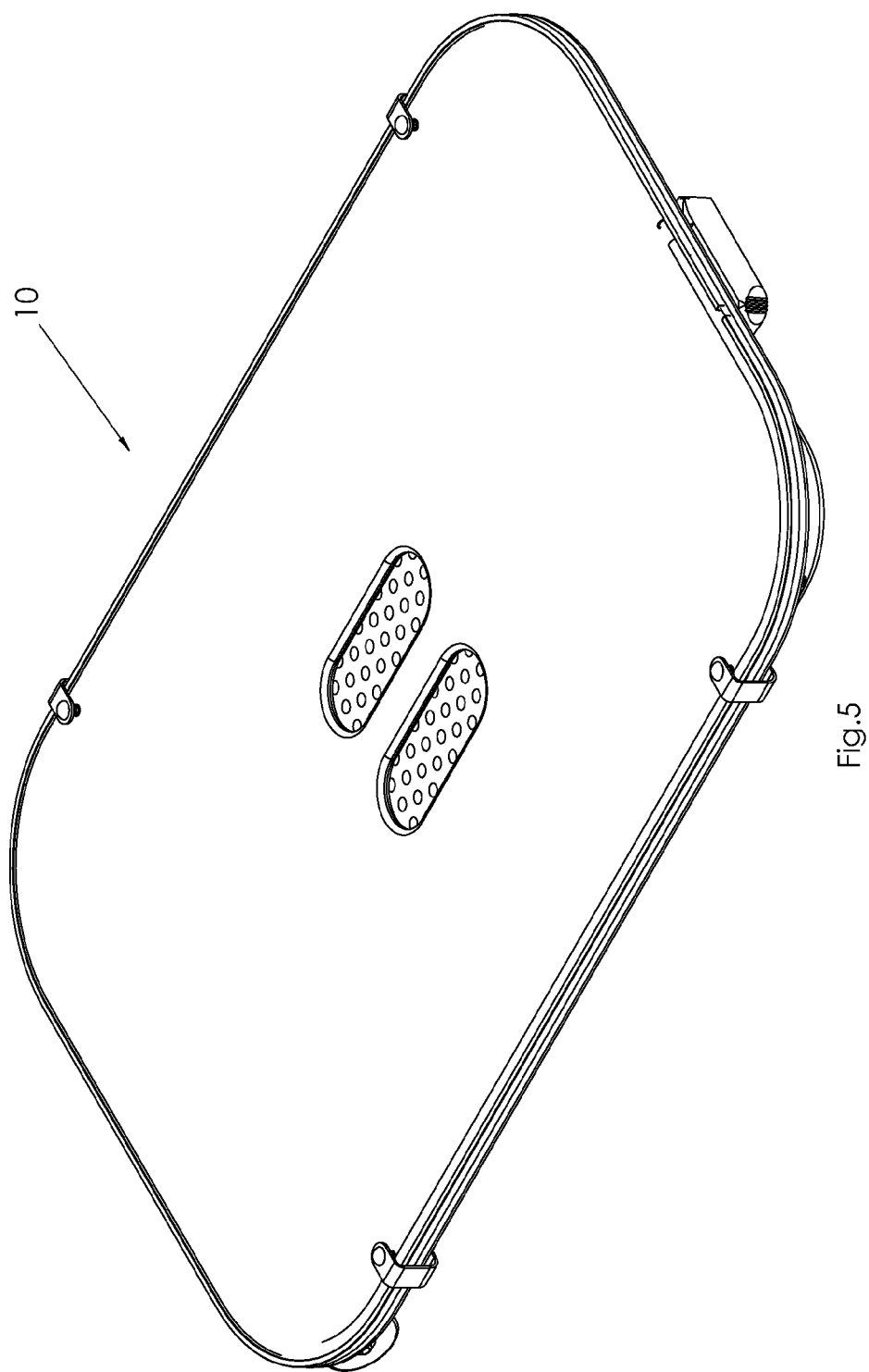
FIG. 5 shows a perspective view of the apparatus of the present invention in collapsed form.
Figure 6:
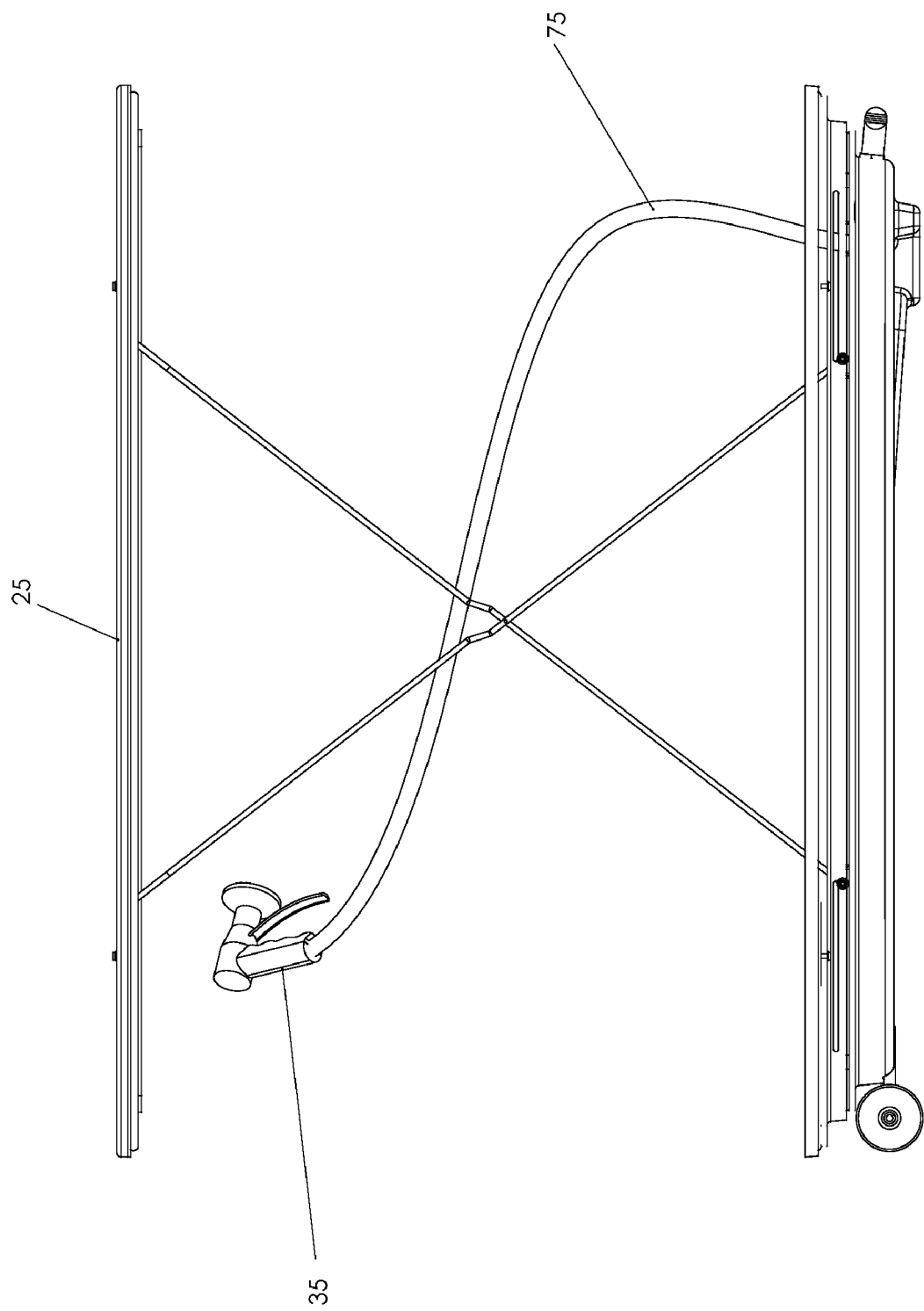
FIG. 6 shows a side view of the apparatus of the present invention without the side wall.

The side support members 20 and 30 support the top member 25. They may be attached to the top member 25 via a track in top member 25. Ideally, side support members 20 and 30 are collapsible. They may ride within a track or notches in the base 15, and collapse into the base 15 in a collapsed mode. Ideally, the top member 25 also fits within the base 15 in the collapsed mode, as shown in FIG. 5.

A water dispensing device 35 is disposed above the base 15. The water dispensing device may be any device which is suitable to dispense water in a usable fashion. For example, a nozzle, a spray nozzle, or even a water outlet of any type may be used. The water dispensing device 35 may be removably mounted below the top cover 25.

A flexible side wall 40 extends substantially between the top member 25 and the base 15. The flexible side wall 40 helps to prevent water from splashing out of the apparatus during use. Ideally, the flexible side wall 40 is removably mounted on a track on the top member 25. In various embodiments, the side wall 40 is a curtain similar to a shower curtain. One or two holes 45 are ideally provided in the side wall 40 to allow a user to pass a hand or two through the side wall 40 in order to wash a pet.

The base 15 ideally includes a cavity 50 to collect water. The cavity 50 is preferably open to the top. A pump 55 is disposed in the base 15, preferably in cavity 50. The pump 55 pumps water to an exit tube 60. The exit tube 60 may extend to a drain, such as a sink drain. Thus, used bathing water can be pumped out of the apparatus 10 and into a drain for disposal.

The apparatus preferably includes a drain tray 65. The drain tray 65 includes drain holes 70 which allow water to pass through to the base 15. The drain tray 65 is removably disposed upon the base 15, and is ideally substantially rigid to withhold pressure from the weight of a pet. In the collapsed mode, the drain tray 65 fits within the base 15.

A water line 75 is included to bring water to the water dispensing device 35. The water line may bring water from a faucet such as a sink faucet, or a hose or spigot. The water line 75 may pass through a passageway 80 in the drain tray 65.

The top member 25 may be a top cover 25. Ideally, the top cover 25 has a handle, or one or more holes 85 at a center portion to facilitate easy grasping of the cover 25.

In various preferred embodiments, the side wall 40 is removable, and the side supports 20 and 30 are collapsible and collapse in such a way that the drain tray 65, side supports 20 and 30, and top cover 25 fit into the base 15 in a collapsed mode. Ideally, the base includes a handle 90 and wheels 95 so that the apparatus can be easily made portable and easily stored in its collapsed mode.

Thus, the apparatus 10 may be conveniently and efficiently used to groom a pet, and can be collapsed and easily stored. The collapsed apparatus 10 shown in FIG. 5 is highly compact and portable. Parts are also easily cleaned.

While specific embodiments have been illustrated and described, numerous modifications come to mind without significantly departing from the spirit of the invention and the scope of protection is limited by the scope of the accompanying claims.

What is claimed is:

1. A pet washing apparatus comprising:
a base substantially impermeable to water;
a top cover member supported above and parallel to said base;
a flexible side wall connected to and extending from said top member to said base, wherein said flexible side wall helps contain water;
first and second side members each including first and second rigid rod supports, wherein said rod supports have two ends with a first end connected to and extending from said base, and a second end connected to and substantially supporting said top member,
wherein said first and second supports extend diagonally between said base and top member;
and a water dispensing device comprising a water line and a nozzle, said water dispensing device disposed above said base;
wherein the top member and the base are approximately the same shape and size so that the top member is able to nest within the base.

2. The pet washing apparatus according to claim 1, wherein said first and second side support members are collapsible.

3. The pet washing apparatus according to claim 1, wherein said side wall is a flexible curtain extending from and removably mounted to a track in said top member.

4. The pet washing apparatus according to claim 3, wherein said curtain has at least one hole therethrough adapted to enable a user to pass the user's hand therethrough.

5. The pet washing apparatus according to claim 1, wherein said base further comprises cavity open to a top of said base adapted to contain a volume of water, and further comprising a pump adapted to pump water from said cavity to a water exit tube.

6. The pet washing apparatus according to claim 5, further comprising a drain tray removably disposed on top of said base, said drain tray having drain holes therein through which water can drain toward the cavity in said base.

7. The pet washing apparatus according to claim 6, further comprising a water line adapted to allow passage of water to said water dispensing device.

8. The pet washing apparatus according to claim 7, wherein said first and second side support members form a collapsible scissor lift mounted to tracks in said top member and said base.

9. The pet washing apparatus according to claim 8, wherein said top member is a top cover, and wherein said side wall is removable and said scissor lifts collapse so that said top cover, said side supports, and said drain tray are collapsible into said base.

10. The pet washing apparatus according to claim 9, wherein said base further comprises a handle on one end, and two wheels on another end adapted such that said apparatus can be lifted up by the handle and rolled via said wheels.

11. The pet washing apparatus according to claim 10, wherein said drain tray comprises a passageway for said water line, and wherein said water line enters through said base and passes through said drain tray to be mounted at said top member.

12. The pet washing apparatus according to claim 7, wherein said top cover comprises at least one hole in a center portion thereof adapted to form a lifting access.

13. The pet washing apparatus according to claim 1, further comprising a drain tray disposed on top of said base, said drain tray having drain holes therein through which water can drain toward a cavity in said base.

* * * * *